Jan. 30, 1968    O. R. STARKEY    3,365,866

TRAVELING PLANT COMPRESSING APPARATUS FOR COTTON PICKERS

Filed Dec. 23, 1964

ORVAL R. STARKEY
INVENTOR

Huebner & Howell
ATTORNEYS

United States Patent Office 3,365,866
Patented Jan. 30, 1968

3,365,866
TRAVELING PLANT COMPRESSING APPARATUS
FOR COTTON PICKERS
Orval R. Starkey, Fresno, Calif., assignor of fifty percent
to Anthony L. Lourenco, Fresno, Calif.
Filed Dec. 23, 1964, Ser. No. 420,525
5 Claims. (Cl. 56—42)

ABSTRACT OF THE DISCLOSURE

A plant compressing apparatus for a mechanical picker having a plurality of power driven picking spindles traveled through a picking zone within the picker in a relative direction opposite to the direction of picker movement including a plant compressing member having endless chains mounted for circuitous movement in the picker and providing a plurality of compression members mounted on the chains in equally spaced substantially upright position thereon providing an inner compressing run adjacent to said picking zone of the passage in opposed relation and in engagemet with the ends of correspondingly adjacent spindles for movement therewith in the same direction to enhance the entwinement of cotton upon the spindles and for substantially unrestricted movement of plants through the picking zone.

---

The present invention constitutes a specialized form of the structure shown and described in my copending application Ser. No. 397,985, entitled "Plant Compressing Apparatus For Mechanical Pickers," filed Sept. 21, 1964, and now abandoned.

As described in my above copending application, conventional compressing apparatus for cotton pickers usually provide a compresing plate which is normally mounted in substantially stationary position in laterally opposed relation to a pluraltiy of rows of traveling picking spindles within the picker. Cotton plants passing through the picker must necessarily slide against the compressing plate. This imposes a frictional drag on the plants sufficient to bend most of the plants and also break off the more brittle plant stalks and branches. The broken fragments intermix with the harvested cotton, and results in aggravated cleaning problems. Furthermore, such relative sliding movement between the compressing plate and the plants causes immature cotton bolls to be knocked loose from the plants or bruises or ruptures the green bolls and other portions of the plants to release plant juices which accumulates on the spindles and other picking mechanisms. Such accumulation impairs picking efficiency, requires frequent cleaning of the mechanism, and lowers the quality of the picked cotton by staining.

Accordingly, it is an object of the present invention to provide an additional specialized form of the compressing apparatus of my above identified copending application.

Another object of the present invention is to provide an improved plant compressing apparatus which is capable of rectilinear movement with the spindles through the picking zone of the picker so as to remain substantially stationary with respect to the plants passing therethrough.

Another object is to provide a plant compressing apparatus which includes a plurality of slats mounted for circuitous movement on endless chains for individual engagement and compression of plants toward the spindles.

Other objects and advantages of the present invention will become more fully apparent in the following description in the specification.

Figure 1:
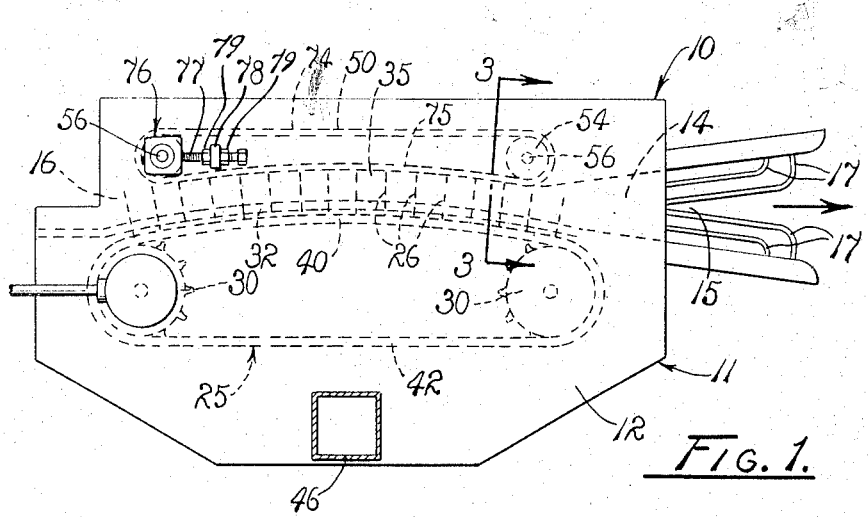
FIG. 1 is a top plan view of a plant compressing apparatus embodying the principles of the present invention shown adapted to the picking unit of a cotton picker.

Referring more particularly to the drawings, a specialized form of the plant compressing apparatus of my above copending application is generally indicated by the reference numeral 10. As best shown in FIG. 1, the plant compressing apparatus is mounted upon a picking unit 11 of a mobile cotton picking machine having a housing 12 enclosing the picking unit and the compressing apparatus 10.

In the embodiment shown in the drawing, the picking unit 11 provides an elongated, generally rectilinear plant passage 14 therethrough adapted to be aligned wtih rows of plants and having opposite inlet and outlet ends 15 and 16, respectively. A pair of forwardly extended, outwardly divergent plant lifting elements 17 are mounted on the picking unit adjacent to the inlet end 15 of the passage, and serve as initial guiding members to lift the lower portions of the cotton plants and guide them through the picking unit.

The picking unit 11 is provided with a picking assembly 25 having a plurality of horizontally disposed, vertically spaced rows of picking spindles 26 mounted on substantially upright spindle bars 27. The bars are borne by a pair of endless chains 28, which are mounted for circuitous travel about a pair of spaced sprocket drums 30. A plurality of elongated grid bars 32 are mounted in the housing 12 in longitudinally extended relation with respect to the passage 14 in the vertically spaced intervals between the horizontal rows of spindles 26. The grid bars define one side of a picking zone 35 within the passage 14 of the housing of the picking unit 11.

The picking assemblies 25 further include a picking run 40 extended into the picking zone 35 and an opposite doffing run 42. Cotton is removed from the spindles 26 in a conventional manner, not shown, for removal from the housing through a pneumatic conveyor conduit fragmentarily shown at 46. The sprocket drums 30 are power driven from a source on the picking machine, not shown, to drive the picking assemblies 25 in a counterclockwise direction, as viewed in FIG. 1. As a result, the spindles 26 are driven within the picking zone 35 in a substantially rectilinear path from the inlet end 15 of the passage to the outlet end 16 thereof. As is well known, the spindles travel rearwardly in the picker at substantially the same speed as the picker travels over the ground, so as to remain stationary with respect to the cotton plants during picking operations.

Figure 2:
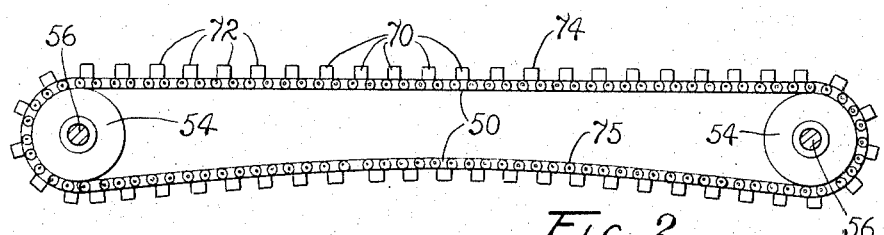
FIG. 2 is a somewhat enlarged top plan view of the plant compressing apparatus of FIG. 1 removed from the picking unit of the cotton picker.
Figure 3:
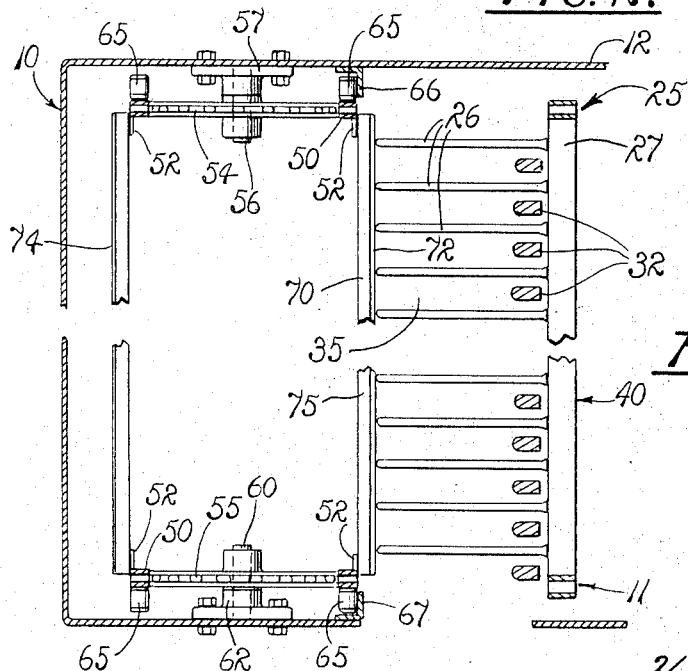
FIG. 3 is a somewhat enlarged foreshortened transverse vertical section through the plant compressing apparatus of the present invention disposed adjacent to the picking spindles of the cotton picker, as taken on line 3—3 of FIG. 1.

As best shown in FIGS. 2 and 3, the plant compressing apparatus 10 provides a pair of elongated, endless, flexible chains 50 having a plurality of slat-mounting brackets 52 individually extending from the individual links thereof. The chains are mounted for circuitous movement about pairs of spaced upper and lower sets of sprockets 54 and 55, respectively. The upper set of sprockets 54 are individually mounted on stub shafts 56 journaled in bearing blocks 57 secured to the upper wall of the housing 12. The lower set of sprockets 55 are similarly mounted on stub shafts 60 journaled in bearing block 62 secured to the lower wall of the housing.

A plurality of rollers 65 are freely rotatably mounted in outward extension from the chains within the housing. A pair of upper and lower arcuately curved guide rails 66 and 67, respectively, are individually secured to the upper and lower walls, respectively, of the housing in peripheral engagement with the upper and lower rollers 65.

A plurality of elongated slats 70 are individually rigidly connected between the brackets 52 of the chains in successively equally-spaced, substantially upright position between the chains. The slats provide a resiliently compressible outer face portion 72 formed of a strip of flexible material, such as rubber or the like which is bonded to the slats. The combined slat and chain assembly provides a substantially straight outer run 74 and an arcuately curved inner compressing run 75 which follows the curvature of the guide rails 66 and 67.

A pair of chain tensioning devices, one of which is indicated by the reference numeral 76, are individually connected to the most rearward of bearing blocks 57 and 62 for adjusting the distance between the axial centers of the stub shafts 56 and 60. Each tensioning device includes an elongated screw-threaded adjusting bolt 77 extended through a bracket 78 on the housing for rectilinear movement of the sprocket against the chain. A pair of lock nuts 79 are mounted on the adjusting bolt on opposite sides of the bracket for locking the sprocket in the desired adjusting position. Upon tensioning of the chains and engagement of the rollers with the guide rails, the face portions 72 of the slats are disposed in intimate contacting relation with the ends of the spindles 26 along the entire length of the picking zone 35. The chain and slat assembly is power driven from the same source as the sprocket drums 30 to drive the chains in a clockwise direction, as viewed in FIG. 1. Consequently, the inner compression run 75 of the slat and chain assembly is driven in the same direction and at the same speed as the picking run 40 of the picking assembly 25.

OPERATION

The operation of the described embodiment of the subject invention is believed to be clearly apparent and is briefly summarized at this point. The picking unit 11 is carried on a self-propelled vehicle, not shown, to traverse a row of cotton plants with the plant passage 14 aligned with a row of plants. During such travel, the plant lifting elements 17 raise the lower branches of the individual plants and guide them toward the inlet end 15 of the plant passage. Continued movement of the picking unit causes the plants to be engaged by the picking spindles 26 and moved within the picking zone 35 in a desired, substantially upright attitude. The plants are then engaged by the inner compressing run 76 of the chain and slat assembly which, like the spindles, travels at the same speed as the forward earth traversing movement of the picking unit. Consequently, no relative motion occurs between those plants in the picking zone 35 and the opposed spindles and plant compressing run 76.

During such operation, the plants are continually compressed against the spindles by the resilient face portions 72 of the slats 70. The adjusted amount of slack in the chains, controls the magnitude of movement of the individual slats laterally outwardly away from the spindles, and thereby accommodate the relatively larger plants progressing through the passage 14.

In view of the foregoing, it is readily apparent that the more specific form of my co-pending application as herein disclosed and described has provided an improved plant compressing apparatus which substantially eliminates any relative movement between the compressing wall and the plants, as well as accommodating variations in the size of cotton plants. Furthermore, since there is no relative scraping or dragging movement between the compressing run 75 of the slats 70, the immature cotton bolls on the plants can move virtually unrestricted through the picking zone, with a minimum of disturbance. The slats in the compressing run also provide a movable flexible wall within the picking zone with the slats individually continually urging the plants toward the picking spindles in an optimum picking attitude.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mechanical picker adapted for earth traversing movement along rows of plants having a housing providing an elongated passage therethrough defining a picking zone to receive a row of plants, a plurality of picking spindles having ends mounted for circuitous movement and having a picking run directed rearwardly to the passage in a direction opposite to the direction of picker movement, means for driving the spindles through the passage at a speed substantially corresponding to the earth traversing speed of the picker; a plant compressing apparatus comprising an endless member mounted for circuitous movement in the housing, a plurality of reaction members mounted on the endless member in equally spaced substantially upright position thereon providing an inner compressing run adjacent to said picking zone of the passage in opposed relation to said picking run of the spindles and with said reaction members engaging the ends of the spindles for movement in the same direction to form a movable wall for substantially unrestricted movement of plants through the picking zone.

2. In a mechanical picker adapted for earth traversing movement along rows of plants having a housing providing an elongated passage therethrough defining a picking zone to receive a row of plants, a plurality of picking spindles having ends mounted for circuitous movement and having a picking run directed rearwardly to the passage in a direction opposite to the direction of picker movement, means for driving the spindles through the passage at a speed substantially corresponding to the earth traversing speed of the picker; a plant compressing apparatus comprising an endless member mounted for circuitous movement in the housing, a plurality of elongated slats mounted on the endless member on successively equally spaced substantially parallel upright axes and having respective face portions providing an inner compressing run with said face portions lying in a common plane along said compressing run adjacent to said picking zone of the passage in opposed relation to said picking run of the spindles with the face portions of the slats engaging the ends of the spindles to form a movable wall for substantially unrestricted movement of plants through the picking zone, and adjustment means to tension the wall toward the spindles and to provide a predetermined slack in the wall for accommodation of plants of varying sizes.

3. In a mechanical picker adapted for earth traversing movement along rows of plants having a housing providing an elongated passage therethrough defining a picking zone to receive a row of plants, a plurality of picking spindles having ends mounted for circuitous movement and having a picking run directed rearwardly to the passage in a direction opposite to the direction of picker movement, means for driving the spindles through the passage at a speed substantially corresponding to the earth traversing speed of the picker; a plant compressing apparatus comprising an endless member, means mounting the endless member for circuitous movement in the housing, a plurality of elongated slats mounted on the endless member on successively equally spaced substantially parallel upright axes having face portions providing an inner compressing run with said face portions lying in a common plane along said compressing run adjacent to said picking zone of the passage in opposed relation to said picking run of the spindles with the face portions of the slats engaging the ends of correspondingly opposite spindles to form a movable wall for substantially unrestricted movement of plants through the picking zone, and means driving the endless member to move said compressing run of the slats at a speed corresponding to the speed of the spindles.

4. In a mechanical picker adapted for earth traversing movement along rows of plants having a housing providing an elongated passage therethrough defining a picking zone to receive a row of plants, a plurality of picking spindles mounted for circuitous movement and having a picking run directed rearwardly to the passage in a direction opposite to the direction of picker movement, means for driving the spindles through the passage at a speed substantially corresponding to the earth traversing speed of the picker; a plant compressing apparatus comprising an endless member, means mounting the endless member for circuitous movement in the housing, a plurality of elongated slats mounted on the endless member on successively equally spaced substantially parallel upright axes having face portions providing an inner compressing run with said face portions lying in a common plane along said compressing run adjacent to said picking zone of the passage in opposed relation to said picking run of the spindles to form a movable wall for substantially unrestricted movement of plants through the picking zone, means driving the endless member to move said compressing run of the slats traveled at a speed corresponding to the speed of the spindles, and guide means mounted in the housing in sliding engagement with said compressing run of the endless member to limit movement of the slats toward the spindles.

5. In a mechanical picker adapted for earth traversing movement along rows of plants having a housing providing an elongated passage therethrough defining a picking zone to receive a row of plants, a plurality of picking spindles having inner ends mounted for circuitous movement and opposite outer ends and including a picking run directed rearwardly to the passage in a direction opposite to the direction of picker movement, means for driving the spindles through the passage at a velocity substantially corresponding to the earth traversing velocity of the picker; a plant compressing apparatus comprising a pair of endless chains; a pair of spaced sprocket shafts journaled in the housing supporting the chains therebetween in spaced substantially parallel relation for circuitous movement; a plurality of elongated slats mounted in interconnecting relation between the chains on successively equally spaced substantially parallel upright axes and having resilient face portions providing an inner compressing run and an opposite outer run with said face portions lying in a common plane along said compressing run adjacent to said picking zone of the passage in opposed relation to said picking run of the spindles to form a movable wall for substantially unrestricted movement of plants through the picking zone, said spindle drive means driving the chains to move said compressing run of the slats in the same direction and at the same speed as that of the spindles; a plurality of rollers mounted on said chains; and a pair of elongated tracks mounted in the housing for guiding the rollers to position the slats against the outer ends of the spindles.

References Cited

UNITED STATES PATENTS

| | | | |
|---|---|---|---|
| 853,916 | 5/1907 | Campbell | 56—43 |
| 1,285,529 | 11/1918 | Wilson | 171—61 |
| 1,426,767 | 8/1922 | Pettengill | 171—61 |
| 1,910,307 | 5/1933 | Rust | 56—43 |
| 2,961,819 | 11/1960 | Edwards | 56—30 |
| 2,988,863 | 6/1961 | Edwards | 56—30 |

ABRAHAM G. STONE, *Primary Examiner.*

RUSSELL R. KINSEY, *Examiner.*